United States Patent
Muramatsu

(10) Patent No.: US 7,471,955 B2
(45) Date of Patent: Dec. 30, 2008

(54) MOBILE TERMINAL DEVICE HAVING ROUTE GUIDING FUNCTION AND ROUTE GUIDING METHOD UTILIZING MOBILE TERMINAL DEVICE

(75) Inventor: Toshihiko Muramatsu, Toyooka-mura (JP)

(73) Assignee: Yamaha Corporation, Hamamatsu-shi (JP)

( * ) Notice: Subject to any disclaimer, the term of this patent is extended or adjusted under 35 U.S.C. 154(b) by 154 days.

(21) Appl. No.: 10/780,747

(22) Filed: Feb. 19, 2004

(65) Prior Publication Data

US 2004/0171391 A1 Sep. 2, 2004

(30) Foreign Application Priority Data

Feb. 19, 2003 (JP) ............ P.2003-041022

(51) Int. Cl.
  *H04Q 7/20* (2006.01)
(52) U.S. Cl. .............. 455/456.6; 455/456.1; 455/404.2; 701/209; 701/211; 340/995.17; 340/995.19; 340/995.28
(58) Field of Classification Search .............. 455/414.2, 455/414.3, 456.1–457, 404.2, 566, 404.1, 455/466, 517, 550.1, 556.1, 556.2, 569.2, 455/575.9; 701/209–215; 340/995.2, 995.17, 340/995.19, 995.28
See application file for complete search history.

(56) References Cited

U.S. PATENT DOCUMENTS

| | | | | |
|---|---|---|---|---|
| 4,513,378 A | * | 4/1985 | Antkowiak ............ | 701/217 |
| 4,521,777 A | * | 6/1985 | Nakamura et al. ..... | 340/995.28 |
| 5,552,990 A | * | 9/1996 | Ihara et al. .............. | 701/208 |
| 5,906,653 A | * | 5/1999 | Ichimura et al. ........ | 701/207 |
| 6,169,497 B1 | * | 1/2001 | Robert ................... | 340/988 |
| 6,480,148 B1 | * | 11/2002 | Wilson et al. ........ | 342/357.08 |
| 6,529,821 B2 | * | 3/2003 | Tomasi et al. ........... | 701/202 |
| 6,810,327 B2 | * | 10/2004 | Akashi .................. | 701/209 |
| 7,023,362 B2 | * | 4/2006 | Futa et al. ............... | 340/988 |
| 2002/0111737 A1 | * | 8/2002 | Hoisko ................. | 701/209 |
| 2002/0115450 A1 | | 8/2002 | Muramatsu | |
| 2002/0152025 A1 | * | 10/2002 | Shimada ............... | 701/209 |
| 2005/0114024 A1 | * | 5/2005 | Benham et al. ........ | 701/224 |

FOREIGN PATENT DOCUMENTS

| | | |
|---|---|---|
| JP | 7-280583 A | 10/1995 |
| JP | 7-301543 A | 11/1995 |
| JP | 10-197277 A | 7/1998 |
| JP | 2002-296047 A | 10/2002 |
| JP | 2000-241173 A | 9/2008 |

* cited by examiner

*Primary Examiner*—Duc Nguyen
*Assistant Examiner*—Anthony S Addy
(74) *Attorney, Agent, or Firm*—Smith Patent Office

(57) ABSTRACT

A mobile terminal device having a route guiding function of guiding a route by obtaining map information from a server system via a radio communication network includes: a position detecting unit which detects a current position of the mobile terminal device; a bearing detecting unit which detects a first bearing to which the mobile terminal device is directed; a target bearing calculating unit which calculates a second bearing from a current position to the destination; a displaying unit which displays a map based on the acquired map information on a section containing the destination and the current position, displays icon images at a position of the destination and the current position respectively, and displays an icon image indicating the first bearing; and a target capturing unit which produces a sound effect in response to a difference between the first and second bearings.

14 Claims, 10 Drawing Sheets

FIG. 2

| ITEM | GROUP | PHONE NUMBER | URL | LATITUDE | LONGITUDE |
|---|---|---|---|---|---|
| SHOP A | S | 03-3333-0000 | www.shopa.com | 38.57 | 135.54 |
| SHOP B | S | 03-3333-0001 | www.shopb.com | 45.63 | 138.73 |
| RESTAURANT C | R | 03-3333-0002 | www.restc.com | 35.36 | 125.61 |
| ...... | ...... | ...... | ...... | ...... | ...... |

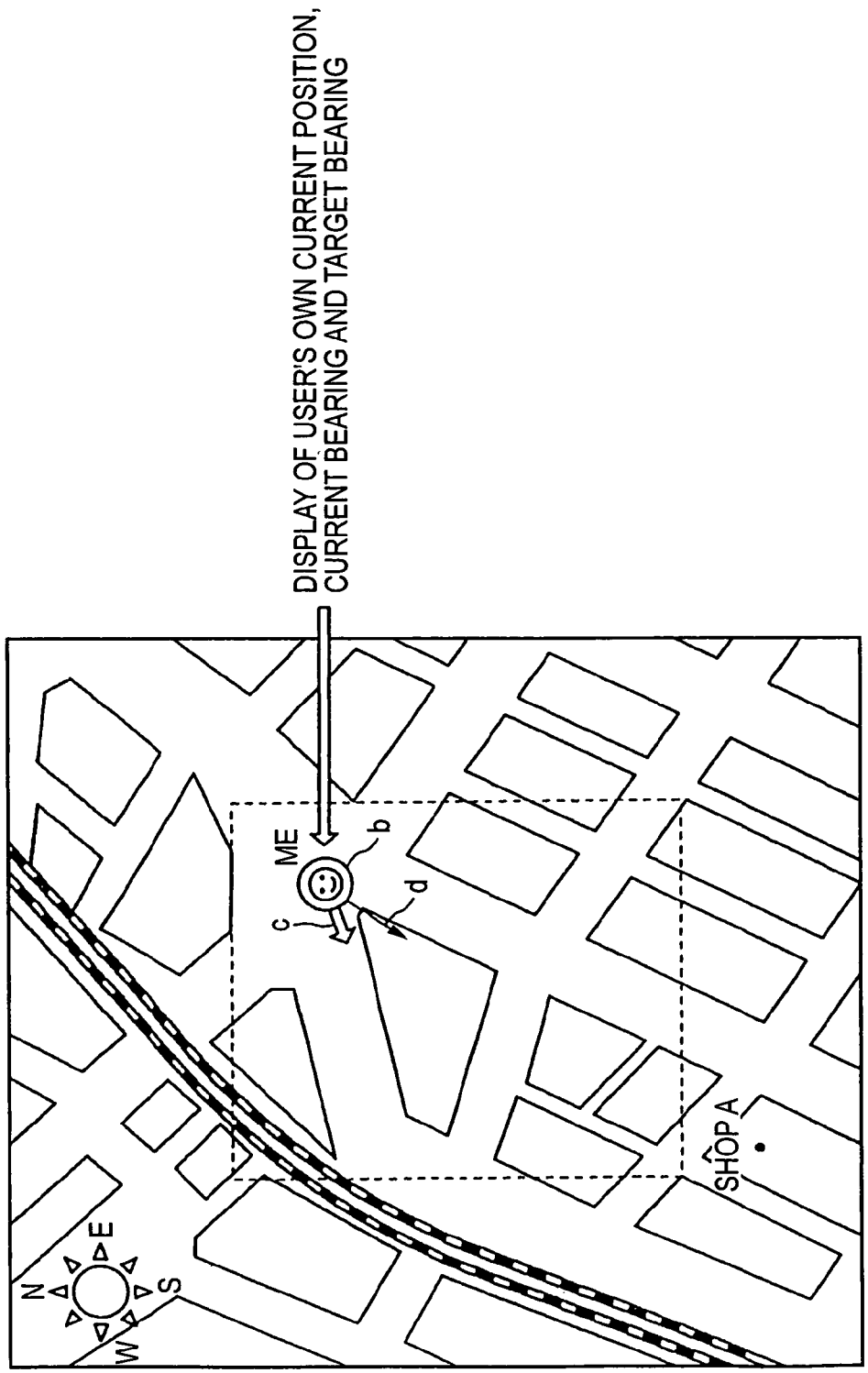

MOBILE TERMINAL DEVICE HAVING ROUTE GUIDING FUNCTION AND ROUTE GUIDING METHOD UTILIZING MOBILE TERMINAL DEVICE

BACKGROUND OF THE INVENTION

The present invention relates to a mobile terminal device having a route guiding function and a route guiding method utilizing the mobile terminal device.

Up to now, the mobile phone with a map navigation function, to which a GPS function of sensing a current position and a bearing compass function using a geomagnetic bearing sensor are provided, etc., and have been manufactured as a product.

For example, the navigation system utilizing the mobile terminal device such as the mobile phone is disclosed in JP H10-197277-A. According to this reference, the user's terminal acquires positional information of the present location by using the GPS. The user's terminal then sets positional information of the destination by using a function of the service server. Next, the device searches a guide route via the service server, while the service server, while the service server offers sequentially positional information of transit points in the middle of the guide route to the destination every time the user arrives at each transit point until the user comes up to the destination. The user's terminal derives a guiding direction indicating the direction of the halfway targets required until the user arrives at the destination. The user's detects the direction in which the LCD of the terminal is directed from the positional information received from the service server. The terminal obtains a relative guiding direction indicating the direction of the destination with respect to the direction of the LCD, and informs the user of the relative guiding direction with an arrow or a sound. The configuration set forth in JP H10-197277-A is able to guide the direction to the destination without map information that needs a large information contents.

Incidentally, since normally the top portion of the displayed map points the North bearing, the user must appreciate previously that the upper side of the displayed map is directed to the North bearing to find the user's destination. As the case may be, the user must find where the land mark indicated on the map is actually located. Further, the user must appreciate at which place the user's own current position is located on the map and in which direction the position of the destination on the map is placed relatively from the user's own current bearing (the current direction of the mobile terminal device). For the above reasons, in order to arrive at the position of the destination from the user's own current position, it took the user a lot of time to decide which way the user should start walking along.

Further, in the map navigation function, in case such a mode is taken that the map information is downloaded from the server, first a wide area map must be downloaded in the prior art. Second, the area of the map must be reduced several times by using the zoom-in function to get a map range containing the destination and the user's own current position. Otherwise, map information with different map scales must be downloaded several times, and thus it is very troublesome to execute such function.

In the technology set forth in JP H10-197277-A, the system is downsized according to the above configuration, nevertheless the user acquires the positional information of the next destination via the communication with the service server every arrival of the halfway destination on the guide route until the user reaches to the final destination without the map. Therefore, the user must communicate with the service server until the user reaches to the final destination. As a result, in case of a communication trouble, the guidance to indicate the next destination is not properly issued, so that in some cases the user may fail to reach the final destination. Further, in case the proper guide route is not derived and thus the guiding direction is given in disregard of the presence of the actually existing building, etc., it may happen that the user cannot know in which way he or she should actually go, e.g., the situation that the user cannot go in that direction because of the building, etc. located in the guiding direction.

SUMMARY OF THE INVENTION

The present invention has been made in view of the above circumstances, and it is an object of the present invention to provide a mobile terminal device having a route guiding function of permitting the user to simply know a direction of a target based on user's current position and direction, and a route guiding method utilizing the mobile terminal device.

In order to solve the aforesaid object, the invention is characterized by having the following arrangement.

(1) A mobile terminal device having a route guiding function of guiding a route by obtaining map information from a server system via a radio communication network, comprising:

a position detecting unit which detects a current position of the mobile terminal device;

a bearing detecting unit which detects a first bearing to which the mobile terminal device is directed;

a map information acquiring unit which transmits predetermined specific information to identify a destination and positional information of the current position to the server system, and acquires map information on a section containing the destination and the current position from the server system;

a target bearing calculating unit which calculates a second bearing from a current position to the destination based on the positional information and the specific information;

a displaying unit which displays a map based on the acquired map information, displays predetermined icon images at a position of the destination and the current position respectively, and displays an icon image indicating the first bearing; and a target capturing unit which produces a sound effect in response to a difference between the first and second bearings.

(2) A mobile terminal device having a route guiding function according to (1), wherein the target capturing unit produces different melodies in response to the difference between the first and second bearings.

(3) A mobile terminal device having a route guiding function according to claim 1, wherein the target capturing unit blinks the icon image displayed at the position of the destination when the first bearing coincides with the second bearing.

(4) A mobile terminal device having a route guiding function of guiding a route by obtaining map information from a server system via a radio communication network, comprising:

a position detecting unit which detects a current position of the mobile terminal device;

a bearing detecting unit which detects a first bearing to which the mobile terminal device is directed;

a map information acquiring unit which transmits predetermined specific information to identify a destination and positional information on the current position to the server system, and acquires map information of a section containing the destination and the current position from the server system;

a target bearing calculating unit which calculates a second bearing from the current position to the destination based on the positional information and the specific information;

a displaying unit which displays a map based on the acquired map information, displays a predetermined icon image at the current position, and displays an icon image indicating the first bearing and an icon image indicating the second bearing; and a target capturing unit which produces a sound effect in response to a difference between the first and second bearings.

(5) A mobile terminal device having a route guiding function according to (4), wherein the target capturing unit produces different melodies in response to the difference between the first and second bearings.

(6) A route guiding method utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, the method comprising the steps of:

causing the server system to execute the steps of, searching the map information containing a destination and the current position from the map database based on positional information of the current position and specific information of the destination which are transmitted from the mobile terminal device, and sending the searched map information to the mobile terminal device; and causing the mobile terminal device to execute the steps of, transmitting predetermined the specific information designated by a user to the server system, transmitting the positional information of the current position detected by the position detecting unit to the server system, receiving the map information sent from the server system, calculating a second bearing from the current position to the destination based on the positional information and the specific information, displaying a map based on the acquired map information, displaying predetermined icon images to overlap with a position of the destination and the current position, and displaying an icon image indicating the first bearing, and producing a sound effect in response to a difference between the first and second bearings.

(7) A route guiding method utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, the method comprising the steps of:

causing the server system to execute the steps of, searching the map information containing a destination and the current position from the map database, based on positional information of the current position and specific information of the destination which are transmitted from the mobile terminal device, and sending the searched map information to the mobile terminal device; and causing the mobile terminal device to execute the steps of transmitting the specific information designated by a user to the server system, transmitting the positional information of the current position detected by the position detecting unit to the server system, receiving the map information sent from the server system, calculating a second bearing from the current position to the destination based on the positional information and the specific information, displaying a map based on the acquired map information, displaying a predetermined icon image at the current position, and displaying an icon image indicating the first bearing and an icon image indicating the second bearing, and producing a sound effect in response to a difference between the first and second bearings.

(8) A computer readable recording medium storing a program for guiding a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database based on positional information of the current position and specific information of the destination which are transmitted from the mobile terminal device, and sending the searched map information to the mobile terminal device; and the program causes the mobile terminal device to execute the steps of, transmitting predetermined the specific information designated by a user to the server system, transmitting the positional information of the current position detected by the position detecting unit to the server system, receiving the map information sent from the server system, calculating a second bearing from the current position to the destination based on the positional information and the specific information, displaying a map based on the acquired map information, displaying predetermined icon images to overlap with a position of the destination and the current position, and displaying an icon image indicating the first bearing, and producing a sound effect in response to a difference between the first and second bearings.

(9) A computer readable recording medium storing a program for guiding a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database, based on positional information of the current position and specific information of the destination which are transmitted from the mobile terminal device, and sending the searched map information to the mobile terminal device; and the program causes the mobile terminal device to execute the steps of transmitting the specific information designated by a user to the server system, transmitting the positional information of the current position detected by the position detecting unit to the server system, receiving the map information sent from the server system, calculating a second bearing from the current position to the destination based on the positional information and the specific information, displaying a map based on the acquired map information, displaying a predetermined icon image at the current position, and displaying an icon image indicating the first bearing and an icon image indicating the second bearing, and producing a sound effect in response to a difference between the first and second bearings.

BRIEF DESCRIPTION OF THE DRAWINGS

FIG. 2 shows a view showing a configuration of data registered in a position database in the embodiment.

FIG. 10 shows an example (another example) of a screen display of the mobile terminal device.

DETAILED DESCRIPTION OF PREFERRED EMBODIMENTS

An embodiment of the present invention will be explained with reference to the drawings hereinafter.

Figure 1:
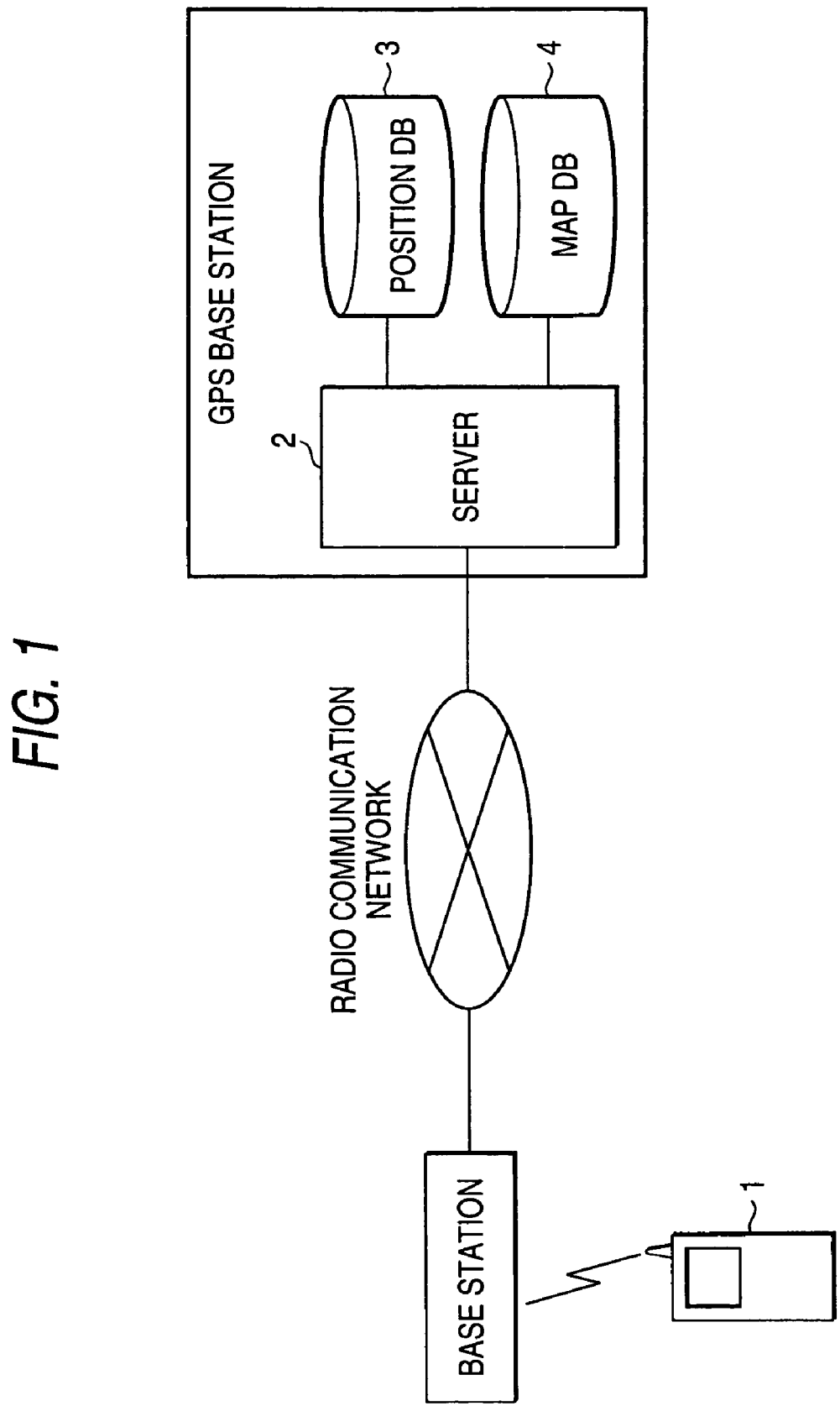
FIG. 1 is a view showing a schematic configuration of a route guiding system utilizing a mobile terminal device as an embodiment of the present invention.

FIG. 1 is a view showing a schematic configuration of a route guiding system utilizing a mobile terminal device as an embodiment of the present invention. In this case, in the present embodiment, the mobile terminal device is constructed by utilizing the conventional mobile phone. The mobile terminal device is not limited to the mobile phone, and PHS (trade mark) (Personal Handyphone System), radio-communicable mobile information terminal (PDA: Personal Digital Assistant), etc. may also be applied. A server 2 described in the following is constructed by utilizing a so-called server-computer.

As shown in FIG. 1, a mobile phone 1 in the present embodiment is connected to a server 2 in a GPS base station via a radio communication network. A position DB (database) 3 and a map DB 4 are connected to the server 2. Specific information used to identify the location as the destination (here, the shop, the institution, etc. are selected as the object) and its latitude/longitude as positional information of the location are correlated mutually and registered in the position DB 3. Sets of map image data and positional information (latitudes/longitudes) of predetermined positions (e.g., the upper end/the lower end and the right end/the left end, etc. of the map) on the map image as the information to identify the position on the map are registered in plural areas in the map DB 4. In reply to the request transmitted from the mobile phone 1, this server 2 delivers positional information of the destination and map information consisting of map image data containing the destination and the current position and positional information of predetermined positions into the mobile phone 1 (details will be described later).

In this case, a configurative example of the data registered in the position database 3 is shown in FIG. 2. The destination name, the group name (characters used to classify a category of business/a business condition of the destination, for example, S represents the shop, R represents the restaurant when first letters of the names representing the category of business/the business condition are employed), the phone number and URL (Uniform Resource Locator) are contained in the specific information that are registered in the position database 3 (where, names of the destinations are registered in the item column in FIG. 2). Here, the reason why the group names are employed is given as follows. That is, for example, often the numerals are used in the phone number registration of the mobile phone to classify the destinations into groups, but the user cannot see what contents are registered in the group numbers because the numerals are not associated with contents of the groups. Therefore, the destinations are classified into groups by the names being associated with the contents of the groups in such a manner that SHOP is represented by S, RESTAURANT is represented by R, and so on, which makes the management easy.

As described above, the above specific information and corresponding latitude/longitude are registered in the position database 3. Therefore, since the user can designate the destination by using the phone number or the URL (normally the user can know them via the medium such as the advertisement, and so forth) of the destination, the pointing of the latitude/longitude is not required of the user to designate the destination.

In this case, in case the specific information transmitted from the mobile phone 1 to identify the destination are the positional information, the position database 3 may be omitted.

Next, a configuration of the above mobile phone 1 will be explained with reference to FIG. 3 hereunder.

Figure 3:
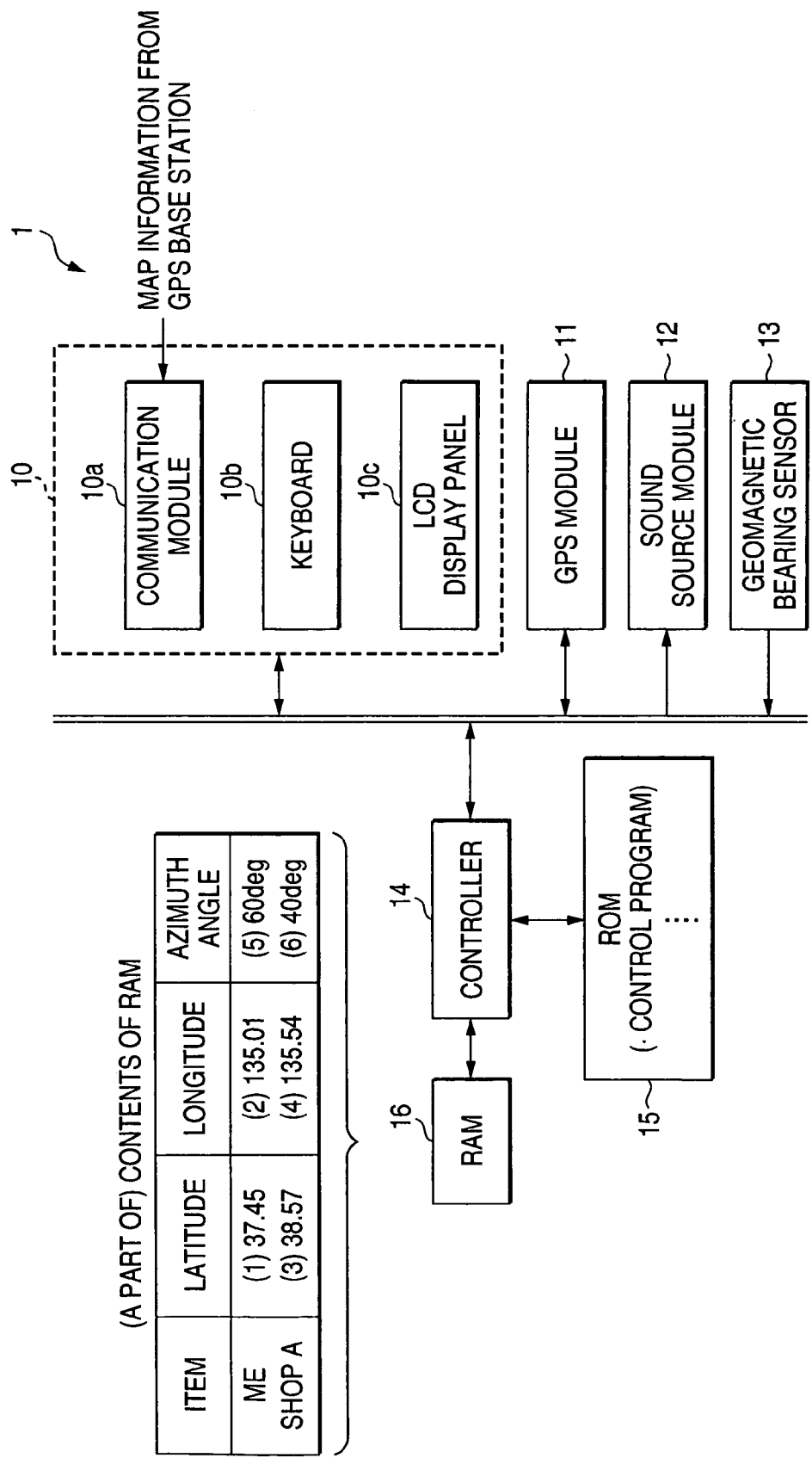
FIG. 3 is a block diagram showing a schematic configuration of a mobile phone in the embodiment.

As shown in FIG. 3, the mobile phone 1 includes a mobile phone function block 10, a GPS module 11, a sound source module 12, a geomagnetic bearing sensor 13, a controller 14, a ROM 15, and a RAM 16. The mobile phone function block 10 includes a communication module 10a used to communicate with the radio communication network as the mobile phone, a key board 10b as an inputting unit, and an LCD display panel 10c as a displaying unit. The GPS module 11 acquires position measuring data obtained from the GPS (Global Positioning System) satellite or the GPS base station. The sound source module 12 receives supply of melody data offered under predetermined conditions (containing the case of call incoming of the phone) and reproduces this melody data (in the case of call incoming of the phone, reproduces a ringing tone), and is constructed by an FM sound source, or the like. The geomagnetic bearing sensor 13 outputs a detected signal in response to the direction along which the sensor is directed (i.e., the concerned mobile phone 1 is directed).

In this case, the above GPS module 11 has a function of measuring the current position of the mobile phone 1 based on the D-GPS position measuring system (differential D-GPS position measuring system). The GPS base station is used as the fixed station of the D-GPS position measuring system. The position measuring data acquired by the GPS module 11 is transmitted to the GPS base station. The precise position measuring calculation is carried out in this GPS base station, and then the resultant positional information (the latitude/the longitude) of the present address is returned to the mobile phone 1. When doing this, a position measuring calculation in the mobile phone 1 is omitted, so that not only the following load of the controller 14 can be reduced but also improvement of a position measuring precision and a reduction of a position measuring time can be achieved. In this case, in order to accept the D-GPS position measuring service, the GPS base station as the fixed station must be located within almost several tens Km from the mobile phone. In contrast, since the position measuring on the mobile phone 1 side can get a sufficient precision at present without employing the D-GPS position measuring system, position measurement by this D-GPS position measuring system is not always needed. In this case, such an advantage can be obtained that there is no need to transmit the position measuring data from the mobile phone 1 to the GPS base station.

The controller 14 controls respective portions of the mobile phone 1 based on a control program (details associated with the present invention will be described later). In this case, when the latitude/longitude of the current position are measured by the mobile phone 1, this controller 14 calculates such latitude/longitude based on the position measuring data given from the GPS module 11. An angle of the bearing to which the mobile phone 1 is directed (azimuth angle: an angle to a reference bearing (e.g., North bearing)) is calculated by the controller 14 based on the detecting signal supplied from the geomagnetic bearing sensor 13. These calculations can be carried out in the same manner as the calculation of the position measurement of the current position or the direction executed by the navigation system or the electronic compass utilizing the GPS in the prior art.

The above control program, current position icon data indicating the current position on the map and target position icon data indicating the position of the destination, current bearing icon data indicating the direction of the mobile phone 1 (having a display mode by an arrow), melody data to produce various melodies played under predetermined conditions, the address of the server 2, and so on are stored in the ROM 15 shown in FIG. 3. The phone number or URL of the destination input by the user, the derived positional information of the current position and the azimuth angle in which the mobile phone 1 is directed, the target bearing described later, and so on are stored in the RAM 16.

Figure 4:
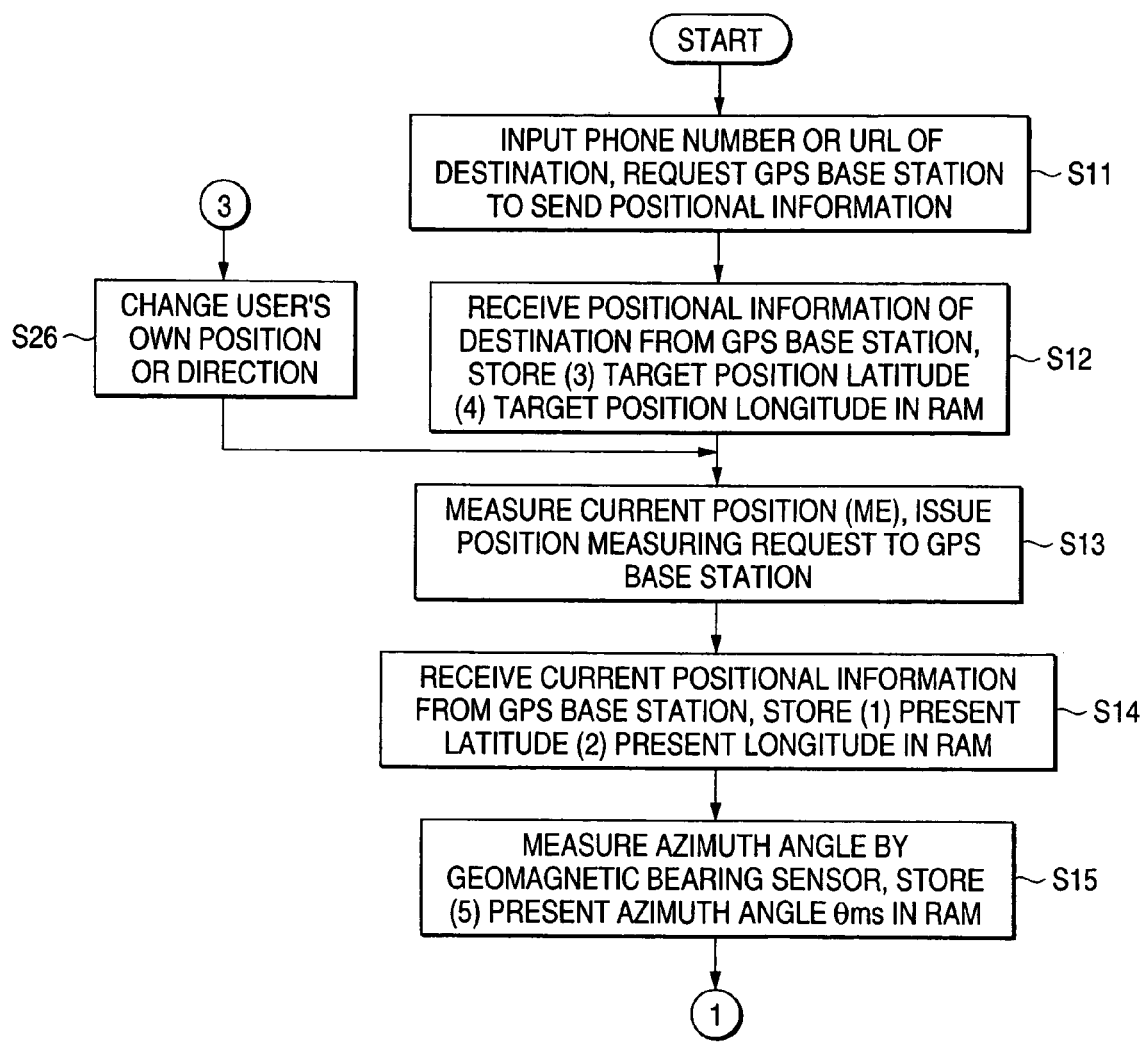
FIG. 4 shows a part of an operational flowchart of the mobile phone in the embodiment.
Figure 5:
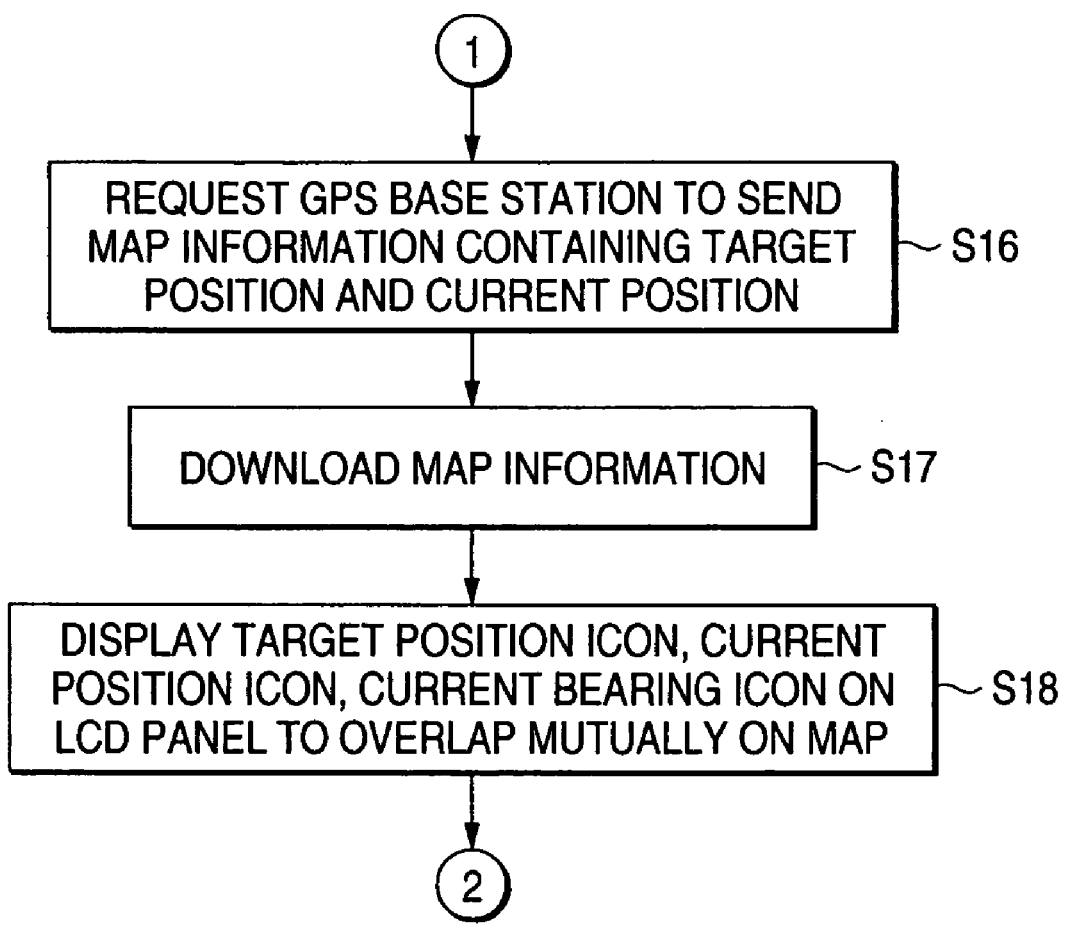
FIG. 5 shows a part of an operational flowchart of the mobile phone in the embodiment.
Figure 6:
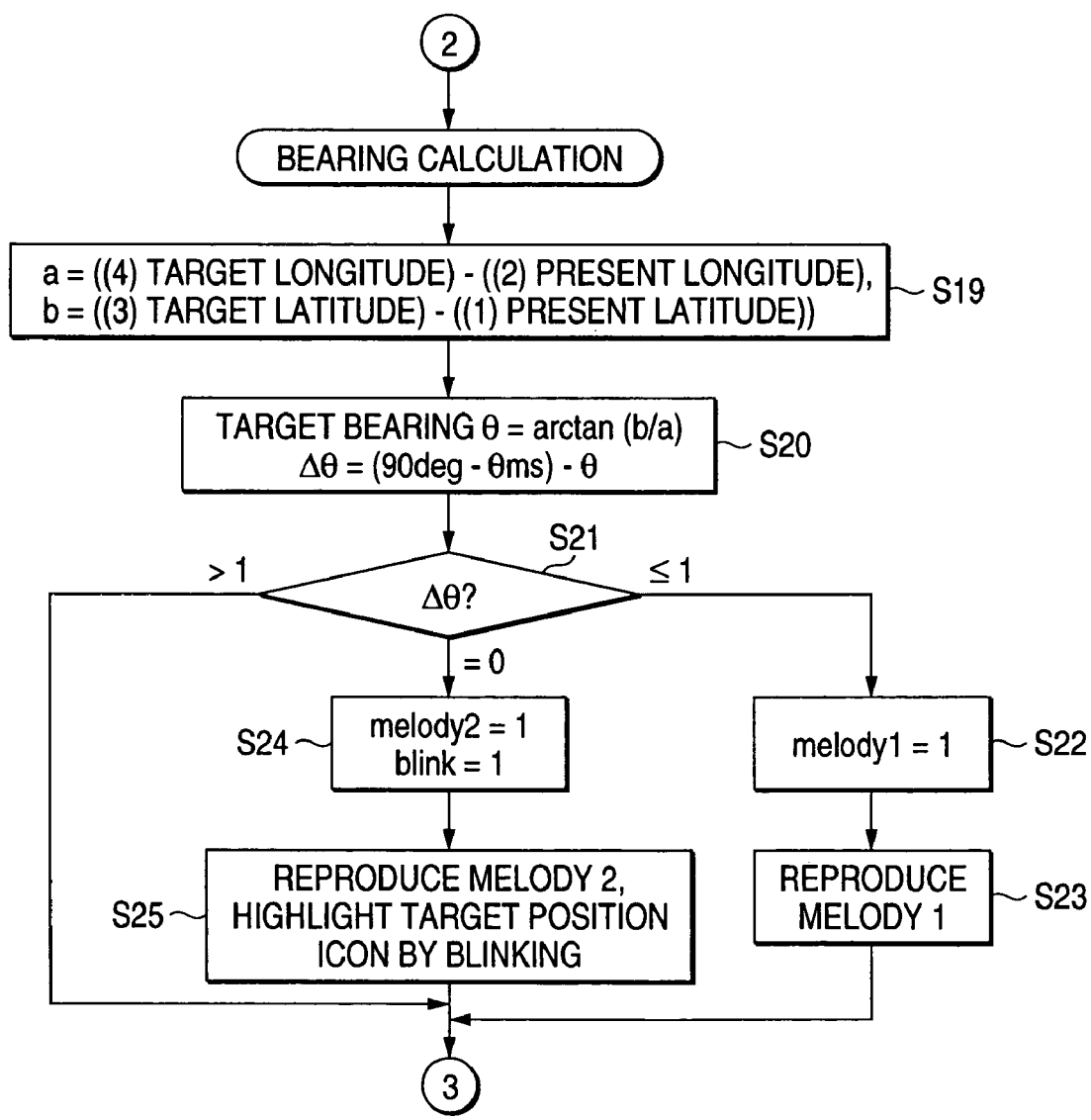
FIG. 6 shows a part of an operational flowchart of the mobile phone in the embodiment.

Next, an operation of a route guiding system utilizing the mobile phone 1 constructed in this manner will be explained with reference to operational flowcharts in FIGS. 4 to 6 hereunder.

In this case, the operational flowcharts explained in the following are an example, and the present invention is not restricted to following flow of the processes.

At first, the user inputs the phone number or URL as the specific information on the destination (here, SHOP A) by using the mobile phone 1, and transmits a request for the positional information containing this information (positional information request) to the GPS base station (step S11). The server 2 receives the positional information request sent from the mobile phone 1. The server 2 searches the positional information corresponding to a search key in the position database 3 while using the received phone number, URL, or the like as the search key, and then sends back the positional information obtained by the search to the mobile phone 1.

The mobile phone 1 receives the positional information of the destination from the GPS base station, and then stores the positional information in RAM 16 (step S12). In the example shown in FIG. 3, the derived positional information (latitude: 38.57, longitude: 135.54) of the destination are stored in the latitude and longitude columns (③ and ④) in the row of the item SHOP A.

Then, the mobile phone 1 measures the current position (step S13). Here, the mobile phone 1 gets the position measuring data acquired by the GPS module 11, and then sends a request for the position measurement containing the position measuring data (position measuring request) to the GPS base station. The GPS base station, when received this position measuring request, calculates the latitude/the longitude based on the received position measuring data, and then sends back the data (positional information of the present address) to the mobile phone 1.

The mobile phone 1 receives the positional information on the present position from the GPS base station, and stores this positional information in the RAM 16 (step S14). In the example shown in FIG. 3, the derived positional information (latitude: 37.45, longitude: 135.01) of the present address are stored in the latitude and longitude columns (① and ②) in the row of the item ME.

Then, an azimuth angle in which the mobile phone 1 is directed is measured by the geomagnetic bearing sensor 13 (step S15). Here, the controller 14 calculates the azimuth angle based on the detecting signal of the geomagnetic bearing sensor 13. The calculated present azimuth angle θ ms is stored in the RAM 16. In the example shown in FIG. 3, the derived present azimuth angle (present bearing: 60 deg) is stored in the azimuth angle column (⑤) in the row of the item ME.

Then, the mobile phone 1 requests the GPS base station to send the map information containing the position of the destination (target position) and the position of the present address (current position) (step S16). At this time, a map information acquiring request is sent from the mobile phone 1 to the server 2. The server 2, when received this map information acquiring request, searches the map database 4 based on the latitude/the longitude of the target position and the current position to get the map information containing the target position and the current position, and then sends back this map information to the mobile phone 1.

Now, a method of selecting the map information containing the map image data in a predetermined area including the target position and the current position by the server 2 will be explained with reference to FIG. 7 hereunder.

Figure 7:
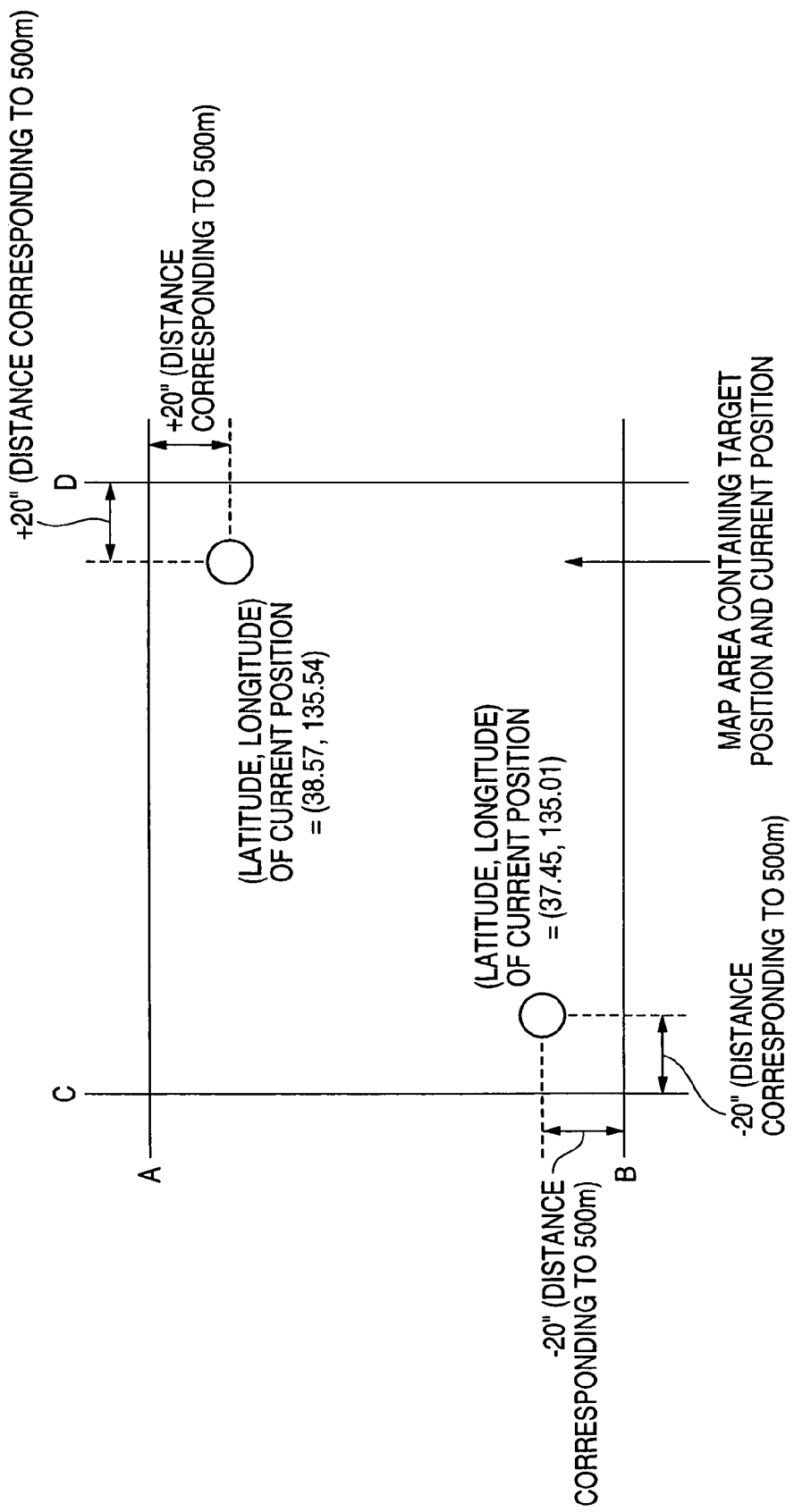
FIG. 7 is a view explaining a method of selecting map information containing map image data in a predetermined area including a target position and a current position by the server, in the embodiment.

Like an example shown in FIG. 7, when the target position is positioned on the Northeast side of the current position, a latitude line A derived by adding 20 minutes to latitude data of the target position and a longitude line D derived by adding 20 minutes to longitude data of the target position are obtained. A latitude line B derived by subtracting 20 minutes from latitude data of the current position and a longitude line C derived by subtracting 20 minutes from longitude data of the current position are obtained. In this manner, the addition/the subtraction applied to select the map image data in a predetermined area are executed appropriately in response to a positional relationship between the target position and the current position such that a range surrounded by lines corresponding to the above lines A, B, C, D contains the target position and the current position. In the neighboring area of Japan, 20 minutes of the latitude/the longitude corresponds to a distance of about 500 m on the map, and the range surrounded by the lines A, B, C, D corresponds to the map area that contains a circumference 500 m of the range, on a diagonal line of which the target position and the current position are positioned. The map image data containing the range surrounded by the lines A, B, C, D are searched from the map database 4, and map information of the area containing this range are obtained.

In this case, as described above, numerical values applied to select the map area by adding/subtracting the latitude/the longitude (20 minutes in the above example) may be set arbitrarily in compliance with the scale and the area of the map, and the necessary map area may be downloaded. Accordingly, it is possible to get immediately the optimum map area containing the target position and the current position of the user. Therefore, such troublesomeness in the prior art can be improved that first the wide area map must be downloaded and then the area of the map must be reduced several times by using the zoom-in function to get the map range containing the target position and the user's own current position, or the map with different scales must be downloaded several times.

The mobile phone 1 downloads the map information that is selected by searching the map database 4 via the server 2 as above (step S17).

Figure 9:
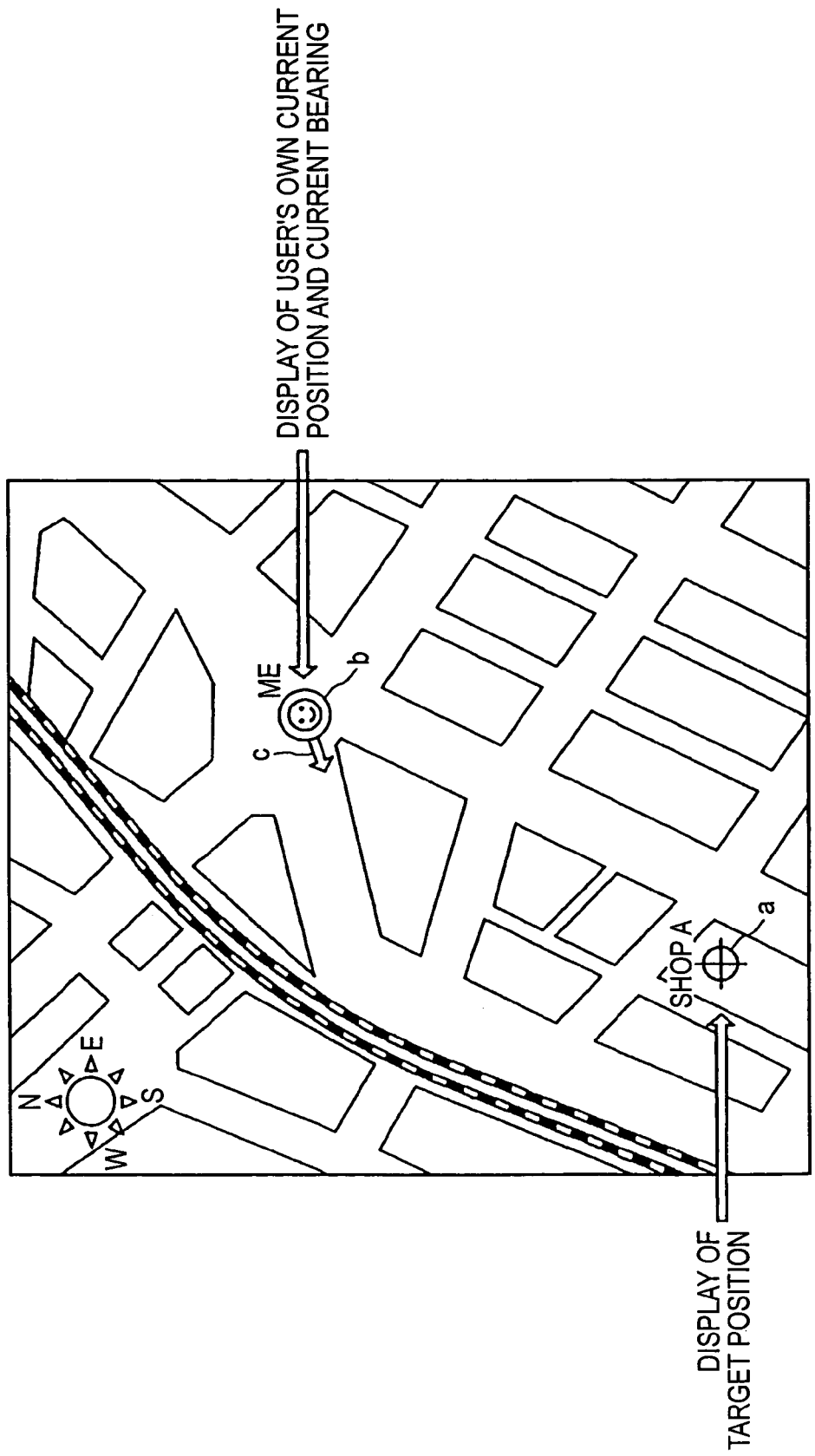
FIG. 9 shows an example of a display screen in the embodiment.

Then, as shown in FIG. 9, the mobile phone 1 displays a target position icon (a symbol a in FIG. 9) and a current position icon (a symbol b in FIG. 9) on the LCD panel 10c to overlap with positions on the map corresponding to latitudes/longitudes of the target position derived in above steps and the current position respectively, and displays a current bearing icon (a symbol c in FIG. 9) to overlap with the current position icon (step S18).

Next, calculation of the target bearing is started. In forgoing steps S12, S14 and step S15, the latitude/longitude of the target position, the latitude/longitude of the current position, and the current azimuth angle were derived, and thus these data are used. In the example shown in FIG. 3, the target position (latitude 2, longitude 2)=(38.57, 135.54) and the current position of the user by the GPS position measurement (latitude 1, longitude 1)=(37.45, 135.01) are derived.

Figure 8:
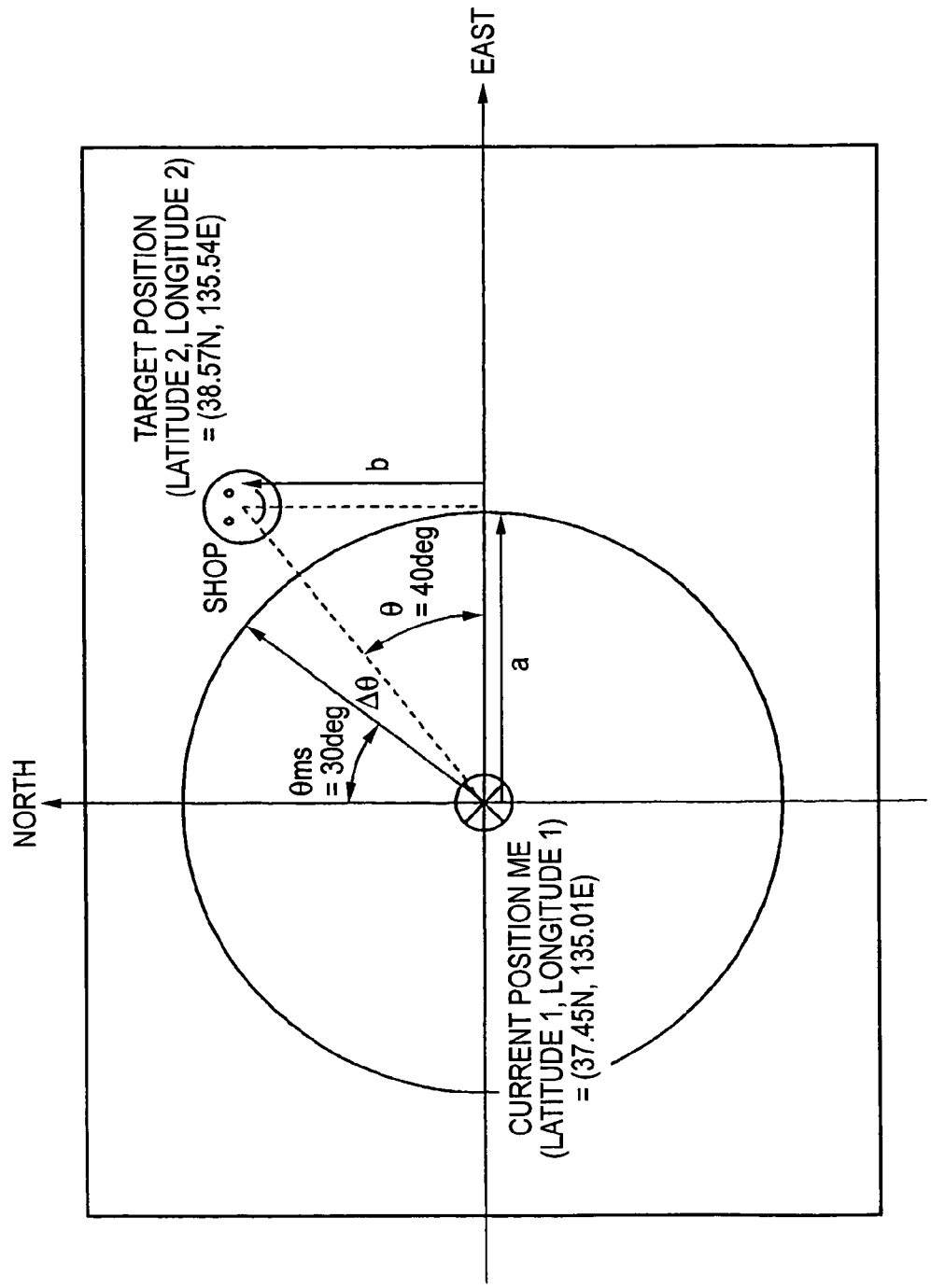
FIG. 8 is a view showing relationships among a current bearing θ ms, a target bearing θ, a relative bearing Δθ, etc.

First, a difference a (=④−②) between the target longitude (longitude ④ of the destination SHOP A) and the present longitude (longitude ② of the current position (ME)) and a difference b (=③−①) between the target latitude (latitude ③ of the destination SHOP A) and the present latitude (latitude ① of the current position (ME)) are calculated (step S19). In the example shown in FIG. 8, a=the latitude 2−the latitude 1=38.57−37.45=1.12 and b=the longitude 2−the longitude 1=135.54−135.01=0.53 are calculated.

Then, a target bearing $\theta=\arctan(b/a)$ and a relative bearing $\Delta\theta=(90\,\text{deg}-\theta\,\text{ms})-\theta$ are calculated by using a, b calculated in step S19 (step S20). Here, the target bearing $\theta$ is a bearing directed from the current position to the target position (where an azimuth angle from the East bearing), the current bearing $\theta$ ms is a current azimuth angle of the mobile phone 1 as described above (where an azimuth angle from the North bearing), and the relative bearing $\Delta\theta$ is a difference between the current bearing and the target bearing. In this case, a range in which a magnitude of $\Delta\theta$ is 1 deg or less may be set arbitrarily.

Then, in the decision in step S21, if the relative bearing $\Delta\theta$ calculated previously is a predetermined positive value (where this value is assumed as "1") or less, the process goes to step S22 wherein a melody 1 flag is set to "1". In this case, this melody 1 flag is a flag indicating that melody data of a melody 1 should be reproduced and an initial value is set to "0".

Then, in step S23, because the melody 1 flag is set to "1", the controller 14 supplies the melody data of the melody 1 to the sound source module 12 to reproduce the melody 1. Then, the process goes to step S26.

In contrast, in the decision in step S21, if the relative bearing $\Delta\theta$ calculated previously is "0", the process goes to step S24 wherein a melody 2 flag and a blink flag are set to "1" respectively. In this case, this melody 2 flag is a flag indicating that melody data of a melody 2 should be reproduced, and this blink flag is a flag indicating that the target position icon should be highlight-blinked. These initial values are set to "0" respectively.

Then, in step S25, because the melody 2 flag is set to "1" and the blink flag is set to "1", the controller 14 supplies the melody data of the melody 2 to the sound source module 12 to reproduce the melody 2, and the controller 14 controls to highlight-blink the target position icon displayed on the LCD display panel 10c. Then, the process goes to step S26.

On the other hand, in the decision in step S21, if the relative bearing $\Delta\theta$ calculated previously is larger than the predetermined positive value (where this value is "1"), the process goes to step S26. In this stage in step S26, if the user changes the user's own position or direction, i.e., changes the position or direction of the mobile phone 1, processes in step S13 et seq. are further executed. In this case, in step S26, movement and change of the direction of the user may be detected by the GPS module 11 or the geomagnetic bearing sensor 13, otherwise the processes in step S13 et seq. may be carried out irrespective of change of the position or the direction after a predetermined time has lapsed.

With the above, the embodiment of the present invention is explained in detail with reference to the drawings. But particular configuration is not limited to this embodiment, and configurations in the scope that does not depart from the gist of the present invention may be contained. For example, in the above embodiment, the map and the icon are displayed in such a manner that the overall map of the map being downloaded from the server 2 is displayed, then the target position icon and the current position icon are displayed on the map to overlap with the positions corresponding to the latitudes/longitudes of the target position and the current position on the map respectively, and the current bearing icon is displayed to overlap with the current position icon. However, as shown in FIG. 10, a part of the map containing the current position (in an area encircled by a dotted line in FIG. 10) may be displayed on the LCD panel 10c, a current position icon (a symbol b in FIG. 10) may be displayed on the map to overlap with the position corresponding to the latitude/longitude of the current position, a current bearing icon (a symbol c in FIG.

10) and a target bearing icon (a symbol d in FIG. 10) indicating the target position may be displayed to overlap with the current position icon, and the displayed area of the map may be shifted/updated following to the movement of the user. In this case, when the target position enters into the displayed area according to the movement of the user, the target position icon is displayed on the map to overlap with the corresponding position. When doing this, the map can be displayed in appropriate size on the mobile terminal device such as the mobile phone having a small display screen, etc. even if the area of the downloaded map is wide.

As described in detail above, according to the present invention, the direction along which the user should go to the pointed destination is instructed by the image display and the sound effect, based on the current position and the direction of the user who utilizes the mobile terminal device of the present invention. Therefore, the user can catch easily the proceeding direction even when such user does not know how to read the map, and can start immediately to walk to the destination.

According to the invention, the map information acquired from the server system contains the destination and the present address. Therefore, when the user is going to proceed from the user's bearing to the destination, the downloading of the map information is required only once and the downloading of the map information is never required plural times.

What is claimed is:

1. A mobile terminal device having a route guiding function of guiding along a route by obtaining map information from a server system via a radio communication network, comprising:
   a position detecting unit which detects a current position of the mobile terminal device;
   a bearing detecting unit which detects a first bearing to which the mobile terminal device is directed;
   a map information acquiring unit which transmits predetermined specific information to identify a destination and positional information of a current position to the server system, and acquires map information on a section containing the destination and the current position from the server system;
   a target bearing calculating unit which calculates a second bearing from a current position to the destination based on the positional information and the predetermined specific information;
   a judging unit that judges whether a difference between the first bearing and the second bearing is less than or greater than a predetermined value, or is equal to the predetermined value;
   a displaying unit which displays a map based on the map information acquired from said map information acquiring unit, displays predetermined icon images at a position of the destination and the current position respectively, and displays an icon image indicating the first bearing; and
   a target capturing unit which produces a first melody when the judging unit judges that the difference is less than the predetermined value, produces no melody when the judging unit judges that the difference is greater than the predetermined value, and produces a second melody when the judging unit judges that the difference is equal to the predetermined value.

2. A mobile terminal device having a route guiding function of guiding along a route by obtaining map information from a server system via a radio communication network, comprising:
   a position detecting unit which detects a current position of the mobile terminal device;
   a bearing detecting unit which detects a first bearing to which the mobile terminal device is directed;
   a map information acquiring unit which transmits predetermined specific information to identify a destination and positional information on a current position to the server system, and acquires map information of a section containing the destination and the current position from the server system;
   a target bearing calculating unit which calculates a second bearing from the current position to the destination based on the positional information and the specific information;
   a judging unit that judges whether a difference between the first bearing and the second bearing is less than or greater than a predetermined value, or is equal to the predetermined value;
   a displaying unit which displays a map based on the map information acquired from said map information acquiring unit, displays a predetermined icon image at the current position, and displays an icon image indicating the first bearing and an icon image indicating the second bearing; and
   a target capturing unit which produces a first melody when the judging unit judges that the difference is less than the predetermined value, produces no melody when the judging unit judges that the difference is greater than the predetermined value, and produces a second melody when the judging unit judges that the difference is equal to the predetermined value.

3. The mobile terminal device having a route guiding function according to claim 1, further comprising a relative bearing calculating unit which calculates the difference between the first bearing and the second bearing.

4. The mobile terminal device having a route guiding function according to claim 3, further comprising means for displaying another icon image indicating the second bearing on said displaying unit.

5. The mobile terminal device having a route guiding function according to claim 1, wherein the position information of the current position is indicated by a latitude A of the current position and a longitude B of the current position, and the predetermined specific information to identify a destination is indicated by a latitude C of the destination and a longitude D of the destination; and
   wherein the second bearing is calculated by a formula:
   $\theta =$ arc tan (the latitude C−the latitude A)/(the longitude D−the longitude B).

6. A route guiding method utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, the method comprising the steps of:
   causing the server system to execute the steps of,
      searching the map information containing a destination and the current position from the map database based on positional information of the current position and specific information of the destination which are transmitted from the mobile terminal device, and
      sending the map information obtained in said step of searching the map information to the mobile terminal device; and
   causing the mobile terminal device to execute the steps of, transmitting the specific information designated by a user to the server system, transmitting the positional information of the current position detected by the position detecting unit to the server system, receiving the map information sent from the server system, calculating a second bearing from the current position to the destination based on the positional information and the specific information, judging whether a difference between the first bearing and the second bearing is less than or greater than a predetermined value, or is equal to the predetermined value;

displaying a map based on the map information acquired in said step of searching the map information, displaying predetermined icon images to overlap with a position of the destination and the current position, and displaying an icon image indicating the first bearing, and producting a first melody when the judging unit judges that the difference is less than the predetermined value, producing no melody when the judging unit judges that the difference is greater than the predetermined value, and producing a second melody when the judging unit judges that the difference is equal to the predetermined value.

7. The mobile terminal device having a route guiding function according to claim 6, further comprising a relative bearing calculating unit which calculates the difference between the first bearing and the second bearing.

8. The mobile terminal device having a route guiding function according to claim 6, wherein the position information of the current position is indicated by a latitude A of the current position and a longitude B of the current position, and the predetermined specific information to identify a destination is indicated by a latitude C of the destination and a longitude D of the destination; and wherein the second bearing is calculated by a formula: θ=arc tan (the latitude C−the latitude A)/(the longitude D−the longitude B).

9. A computer readable recording medium storing a program for guiding along a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database based on positional information of the current position and specific information of the destination which are transmitted from the mobile terminal device, and sending the map information obtained in said step of searching the map information to the mobile terminal device; and the program causes the mobile terminal device to execute the steps of, transmitting the specific information designated by a user to the server system, transmitting the positional information of the current position detected by the position detecting unit to the server system, receiving the map information sent from the server system, calculating a second bearing from the current position to the destination based on the positional information and the specific information, judging whether a difference between the first bearing and the second bearing is less than or greater than a predetermined value, or is equal to the predetermined value;

displaying a map based on the map information acquired in said step of searching the map information, displaying predetermined icon images to overlap with a position of the destination and the current position, and displaying an icon image indicating the first bearing, and producing a first melody when the judging unit judges that the difference is less than the predetermined value, producing no melody when the judging unit judges that the difference is greater than the predetermined value, and producing a second melody when the judging unit judges that the difference is equal to the predetermined value.

10. The route guiding method utilizing a mobile terminal device according to claim 9, further comprising the step of: calculating a relative bearing which is the difference between the first bearing and the second bearing.

11. A computer readable recording medium storing a program for guiding along a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database, based on positional information of the current position and specific information of the destination which are transmitted from the mobile terminal device, and sending the map information obtained in said step of searching the map information to the mobile terminal device; and the program causes the mobile terminal device to execute the steps of, transmitting the specific information designated by a user to the server system, transmitting the positional information of the current position detected by the position detecting unit to the server system, receiving the map information sent from the server system, calculating a second bearing from the current position to the destination based on the positional information and the specific information, judging whether a difference between the first bearing and the second bearing is less than or greater than a predetermined value, or is equal to the predetermined value;

displaying a map based on the map information acquired in said step of searching the map information, displaying a predetermined icon image at the current position, and displaying an icon image indicating the first bearing and an icon image indicating the second bearing, and producing a first melody when the judging unit judges that the difference is less than the predetermined value, producing no melody when the judging unit judges that the difference is greater than the predetermined value, and producing a second melody when the judging unit judges that the difference is equal to the predetermined value.

12. A computer readable recording medium storing a program for guiding along a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database based on positional information of the current position and specific information of the destination which are transmitted from the mobile terminal device, and sending the map information obtained in said step of searching the map information to the mobile terminal device; and the program causes the mobile terminal device to execute the steps of, transmitting the specific information designated by a user to the server system, transmitting the positional information of the current position detected by the position detecting unit to the server system, receiving the map information sent from the server system, calculating a second bearing from the current position to the destination based on the positional information and the specific information, judging whether a difference between the first bearing and the second bearing is less than or greater than a predetermined value, or is equal to the predetermined value;

displaying a map based on the map information acquired in said step of searching the map information, displaying predetermined icon images to overlap with a position of the destination and the current position, and displaying an icon image indicating the first bearing, and producing a first melody when the judging unit judges that the difference is less than the predetermined value, produces a second melody when the judging unit judges that the difference is greater than the predetermined value, and produces no melody when the judging unit judges that the difference is equal to the predetermined value.

13. The computer readable recording medium storing a program for guiding along a route with utilizing a mobile terminal device according to claim 12, further comprising the step of: calculating a relative bearing which is the difference between the first bearing and the second bearing.

14. A computer readable recording medium storing a program for guiding along a route with utilizing a mobile terminal device including a position detecting unit for detecting a current position of the mobile terminal device and a bearing detecting unit for detecting a first bearing to which the mobile terminal device is directed to the mobile terminal device, and a server system, to which the mobile terminal device is connected via a radio communication network and which stores a map database including map information including map image data and information to identify a position on a map, wherein the program causes the server system to execute the steps of, searching the map information containing a destination and the current position from the map database, based on positional information of the current position and specific information of the destination which are transmitted from the mobile terminal device, and sending the map information obtained in said step of searching the map information to the mobile terminal device; and the program causes the mobile terminal device to execute the steps of, transmitting the specific information designated by a user to the server system, transmitting the positional information of the current position detected by the position detecting unit to the server system, receiving the map information sent from the server system, calculating a second bearing from the current position to the destination based on the positional information and the specific information, judging whether a difference between the first bearing and the second bearing is less than or greater than a predetermined value, or is equal to the predetermined value;

displaying a map based on the map information acquired in said step of searching the map information, displaying a predetermined icon image at the current position, and displaying an icon image indicating the first bearing and an icon image indicating the second bearing, and producing a first melody when the judging unit judges that the difference is less than the predetermined value, produces a second melody when the judging unit judges that the difference is greater than the predetermined value, and produces no melody when the judging unit judges that the difference is equal to the predetermined value.

* * * * *